(12) United States Patent
Salihi

(10) Patent No.: US 10,255,592 B2
(45) Date of Patent: *Apr. 9, 2019

(54) WIRELESS SERVICE PROVIDER SYSTEM AND METHOD FOR ACTIVATING AND SELLING A WIRELESS SERVICE ON A WIRELESS DEVICE

(71) Applicant: TracFone Wireless, Inc., Miami, FL (US)

(72) Inventor: Dana Salihi, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,326

(22) Filed: Apr. 10, 2018

(65) Prior Publication Data

US 2018/0232719 A1    Aug. 16, 2018

Related U.S. Application Data

(63) Continuation of application No. 15/478,513, filed on Apr. 4, 2017, now Pat. No. 9,940,613, which is a (Continued)

(51) Int. Cl.
| | |
|---|---|
| *G06Q 20/28* | (2012.01) |
| *H04M 15/00* | (2006.01) |
| *G06Q 20/20* | (2012.01) |
| *H04W 8/18* | (2009.01) |
| *G06Q 20/14* | (2012.01) |
| *G06Q 20/18* | (2012.01) |

(Continued)

(52) U.S. Cl.
CPC ............ *G06Q 20/28* (2013.01); *G06Q 20/14* (2013.01); *G06Q 20/18* (2013.01); *G06Q 20/20* (2013.01); *G06Q 20/202* (2013.01); *G06Q 20/22* (2013.01); *G06Q 20/223* (2013.01); *G06Q 20/32* (2013.01); *G06Q 20/327* (2013.01); *G06Q 20/3278* (2013.01); *G06Q 20/382* (2013.01); *G06Q 20/40145* (2013.01); *H04M 15/80* (2013.01); *H04M 17/35* (2013.01); *H04W 4/24* (2013.01); *H04W 8/18* (2013.01); *H04W 8/265* (2013.01); *H04W 12/06* (2013.01); *H04W 12/08* (2013.01)

(58) Field of Classification Search
CPC ...................................................... G06Q 20/28
USPC ................................................... 455/406–408
See application file for complete search history.

(56) References Cited

U.S. PATENT DOCUMENTS 6,560,217 B1 * 5/2003 Peirce, Jr. ............... H04L 45/58
                                                                370/351
9,137,347 B1 * 9/2015 Lee .......................... H04M 1/66
(Continued)

*Primary Examiner* — Joel Ajayi
(74) *Attorney, Agent, or Firm* — BakerHostetler

(57) ABSTRACT

A wireless service provider system and associated methods of using the system for the sale and/or activation of wireless services is disclosed. The system includes a communication interface for a wireless device having a unique identifier. A backend system computer of the wireless service provider system can receive a unique identifier corresponding to the wireless device; authorize the activation of the wireless service corresponding to the unique identifier of the wireless device; and record, in a database, the authorized unique identifier to improve a user's experience and ease of activation/provisioning of services for the wireless device.

20 Claims, 6 Drawing Sheets

Related U.S. Application Data continuation of application No. 14/984,701, filed on Dec. 30, 2015, now Pat. No. 9,613,345.

(60) Provisional application No. 62/098,086, filed on Dec. 30, 2014.

(51) Int. Cl.
| | |
|---|---|
| *G06Q 20/22* | (2012.01) |
| *G06Q 20/32* | (2012.01) |
| *G06Q 20/38* | (2012.01) |
| *G06Q 20/40* | (2012.01) |
| *H04M 17/00* | (2006.01) |
| *H04W 8/26* | (2009.01) |
| *H04W 4/24* | (2018.01) |
| *H04W 12/06* | (2009.01) |
| *H04W 12/08* | (2009.01) |

(56) References Cited

U.S. PATENT DOCUMENTS

2005/0195743 A1* 9/2005 Rochberger ........ H04L 43/0876
370/235
2013/0085936 A1* 4/2013 Law ................... G06Q 20/04
705/40

* cited by examiner

HOME SCREEN

200

SUBSEQUENT SCREEN

250

WIRELESS SERVICE PROVIDER SYSTEM AND METHOD FOR ACTIVATING AND SELLING A WIRELESS SERVICE ON A WIRELESS DEVICE

CROSS REFERENCE TO PRIOR APPLICATIONS

This application is a continuation of the U.S. patent application Ser. No. 15/478,513, filed Apr. 4, 2017, now U.S. Pat. No. 9,940,613 issued Apr. 10, 2018, which is a continuation of the U.S. patent application Ser. No. 14/984,701, filed Dec. 30, 2015 now U.S. Pat. No. 9,613,345 issued Apr. 4, 2017, which are incorporated herein by reference in their entirety. This application also claims the benefit of U.S. Provisional Application No. 62/098,086 filed on Dec. 30, 2014, which is hereby incorporated by reference for all purposes as if fully set forth herein.

BACKGROUND OF THE DISCLOSURE

1. Field of the Disclosure

The invention relates to a wireless service provider system and method for the sale and activation of wireless services on wireless devices. More particularly, the invention relates to methods for provisioning wireless services on wireless devices using a communication protocol.

2. Related Art

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. A MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data and number of minutes/text messages used.

The services provided by both the MNOs and MVNOs often implement activation cards, also known as airtime cards, for the sale and activation and/or addition of a wireless service, e.g. talk airtime, data, or text messaging. Activation cards generally include a unique code that may include a scratch off area obscuring the unique code. Codes are correlated to a wireless service and must be recorded in a service provider's database prior to distributing the activation card to a respective point-of-sale and reaching the customer. A record of every airtime card distributed is therefore kept for the activation of the corresponding wireless service until the card becomes obsolete through redemption or expiration. Once a card is sold to a user, the user must manually scratch off the covering of the code and manually enter the code and for activation of the wireless service. Codes are generally made long and complex to prevent unauthorized use of the codes to activate non-purchased wireless services.

Convenience, timeliness, and reliability of the wireless providers' backend systems are key factors that play into a user's experience. By developing a system to improve at least these factors, a more positive experience can be provided to the user. The improved experience will help retain customer base and increase the amount of customers willing to purchase wireless services from MNOs and MVNOs. In order to do so, the following needs can be addressed by enabling new improved systems that can be implemented for the activation of a wireless service.

A need exists to decrease the amount of processing of the backend systems of wireless providers to provide faster activation of wireless services. Another need in the art also exists for an error free and more expedient method and system for customers to extend cellular services without using airtime cards. A further need exists in the art for a method, system and application to enable wireless providers and retailers to sell and authenticate wireless services in convenient locations, including transient locations, in an expedited manner, and without compromising unauthorized activation of services or the security of the wireless providers' backend systems.

Accordingly, a more convenient, secure, and time efficient approach is needed for the sale and activation of wireless services.

SUMMARY OF THE DISCLOSURE

The foregoing needs are met, to a great extent, by the invention, providing a system and associated methods for activating services and subscriptions on wireless devices and/or systems implementing a communication interface to connect with a point-of-sale terminal via a communication protocol such as a peer-to-peer protocol or similar protocol. In particular, the invention is intended to solve the challenges by using a communication interface on a wireless device with at least one unique identifier that corresponds to a purchased/selected wireless service and/or subscription. According to some aspects of the disclosure, the services requested to be activated may include at least one of initial provisioning or activation, device upgrades, device reactivations, wireless number changes, the addition or purchase of services including airtime, data and text messaging, enrollments or content, and wireless number porting for wireless devices that have already been activated.

According to aspects of the disclosure a wireless service provider system for authorizing wireless service on a wireless device includes a point-of-sale terminal, a peer-to-peer protocol configured to connect the wireless device and the point-of-sale terminal, a unique identifier of the wireless device, at least one application associated with the wireless device configured to provide the unique identifier of the wireless device, the least one application of the wireless device further configured to conduct transactions from the wireless device to the point-of-sale terminal, and a processor of the wireless device configured to execute the first application and second application of the wireless device.

According to further aspects of the disclosure, a method of authorizing wireless service using a peer-to-peer protocol includes connecting a wireless device to a point-of-sale terminal through the peer-to-peer protocol, selecting at least one wireless service, making a payment, in response to the selection of at least one wireless service, for the at least one wireless service from the wireless device to the point-of sale terminal, activating, in response to making a payment, the unique identifier, confirming, in response to activating the unique identifier, activation of the unique identifier, and activating the at least one wireless service.

There has thus been outlined, rather broadly, certain aspects of the invention in order that the detailed description thereof herein may be better understood, and in order that the present contribution to the art may be better appreciated. There are, of course, additional aspects of the invention that will be described below and which will also form the subject matter of the claims appended hereto.

In this respect, before explaining at least one aspects of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
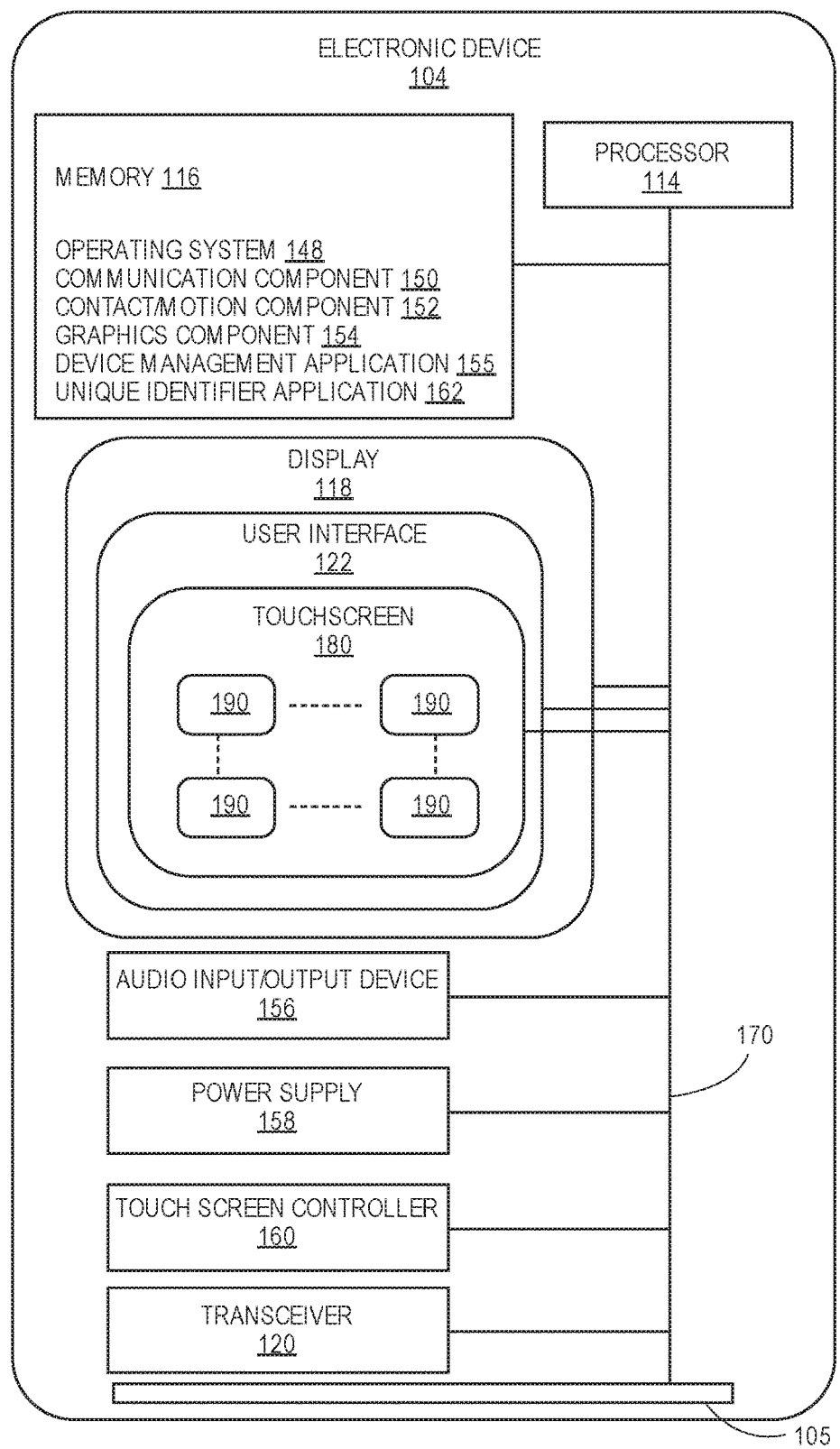
FIG. 1 illustrates a block diagram with exemplary components of a wireless device in accordance with aspects of the disclosure.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone." With respect to remote alert devices, data transmission over a wireless network, including on a pre-paid basis using a near field communication card, is contemplated for alarm fobs, wireless remote camera devices, vehicle monitoring systems, home based security systems that do not require a landline or use both a landline and a wireless network for added reliability, and similar systems where wireless network authorization may be provided with peer-to-peer communication capabilities. The vehicle monitoring system may include a vehicle communication interface, components to determine vehicle operation, and/or the like. The home based security system may include door sensors, window sensors, motion detectors, interface devices, and/or the like.

A "point-of-sale" terminal as used herein can refer to a location where one or more wireless devices and/or services can be sold and/or activated which may or may not require sales personnel. A point-of-sale terminal can include, for example, a vending machine, an automated kiosk, a retailer store, a gas station, and the like.

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 5G network, that may utilize the teachings of the present application to sell, activate, monitor, redeem, and/or track, the activation of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Referring now to FIG. 1, a block diagram with exemplary components of a wireless device 104 in accordance with aspects of the disclosure is shown. In particular, the exemplary components which include a communication interface 105, which may be used during the distribution, verification, and/or sale/purchase, of a wireless service. Other uses of the communication interface 105 for the activation of a wireless service can include but are not limited to a change of phone settings, an activation message (e.g. text message) to be created and sent, starting of an application (e.g. payment application), and the like. In one aspect, the communication interface 105 may initiate communication of the wireless device 104 through a peer-to-peer protocol or the like on a communication channel as defined herein.

The communication interface 105 can be in communication with a processor 114, memory 116, the transceiver 120, and a user interface 122. The processor 114 may be a central processing unit configured to execute instructions such as instructions related to software programs. Any processor can be used for the electronic device as understood to those of ordinary skill in the art. The display 118 may be a liquid crystal display (LCD). Preferably the LCD includes a backlight to illuminate the various color liquid crystals to provide a more colorful display. The user interface 122 may be any type of physical input as readily employed in the field. For example, the user interface 122 may have physical buttons. Alternatively, the user interface 122 may be implemented on a touchscreen 180, a motion sensor (not shown), and the like. Finally, wireless device 104 may include a power supply 158.

The memory 116 of the wireless device 104 may further include an operating system 148, a communication component 150, a contact/motion component 152, a graphics component 154, and the like. The operating system 148 together with the various components provides software functionality for each of the components of the wireless device 104. The memory 116 may include a high-speed, random-access memory. Also, the memory 116 may be a non-volatile memory, such as magnetic fixed disk storage, SIM, UICC, cloud-based memory, flash memory or the like. These various components may be connected through various communication lines including a data bus 170.

The wireless device 104 can include an audio input/output device 156. The audio input/output device 156 may include speakers, speaker outputs, and the like, providing sound output; and may include microphones, microphone inputs, and the like, for receiving sound inputs. In an exemplary aspect, the audio input/output device 156 may include an analog to digital converter and a digital to audio converter for audio input and output functions respectively.

In another aspect, the wireless device 104 may include a transceiver 120. The wireless device 104 may provide radio and signal processing as needed to access a wireless network for services. The processor 114 may be configured to process call functions, data transfer, and the like and provide an array of services, based on those functions, to the user.

In an exemplary aspect, the touchscreen 180 of the invention may be implemented in the display 118 and may detect a presence and location of a touch of a user within the display area. For example, touching the display 118 of the wireless device 104 with a finger or hand. The touchscreen 180 may also sense other passive objects, such as a stylus. Additionally, the wireless device 104 may further include a touch screen controller 160.

In one operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover the display 118 may include a plurality of screens. The display 118 showing one screen at a time. The user may interact with the display 118 to move a screen into view on the display 118. Various objects 190 may be located in each of the screens.

The touchscreen 180 may be implemented as a resistive touchscreen, a surface acoustic wave touch screen, a capacitive touchscreen, self-capacitance sensors, infrared sensors, dispersive signal technology, acoustic pulse recognition, or the like.

The display 118 is generally configured to display a graphical user interface (GUI) 122 that provides an easy to use visual interface between a user of the wireless device 104 and the operating system or application(s) running on the wireless device 104. Generally, the GUI presents programs, files and operational options with graphical images. During operation, the user may select and activate various graphical images displayed on the display 118 in order to initiate functions and tasks associated therewith.

In another aspect of the invention, the memory 116 of the wireless device 104 can include a database for storing user information. The user information may include information such as full name, address, email address, contact number, credit card information, and the like. In one aspect, the database may include security questions. In another aspect, the database may include user specified preferences.

In yet another aspect of the application, the memory 116 of a wireless device 104 can include a wireless service activation application 155. The application 155 may be preinstalled or downloaded from an application store. The wireless service activation application 155 may be configured to control use of the wireless device 104 based on interaction with a wireless provider backend server (shown in FIG. 4) for the activation of a wireless service.

The wireless service activation application 155 may utilize an internal accounting module to establish an account with a representation of prepaid funds or available credit for wireless services. In some aspects, the internal accounting module of the wireless service activation application 155 may also be used to store and/or transmit a plurality of charge rates as well as a billing/payment algorithm. The internal accounting module can classify each wireless service (data, voice, SMS) into one of a plurality of billing categories; receive data correlated to the unique identifier, select a charge rate corresponding to that billing category; calculate an appropriate charge for the data usage, voice usage, and SMS usage in real time by using the selected charge rate; and apply this appropriate charge to the account. For example, upon the retrieval and/or verification of a unique identifier of a wireless device 104 by the communication interface 105, the one or more steps may automatically take place to apply an appropriate charge to the account.

A unique identifier application 162 may provide a unique identifier of the wireless device. The wireless device unique identifier may be in the form of Mobile Directory Number, International Mobile Equipment Identity, Mobile Equipment Identifier, login, or the like.

In some aspects, once the internal accounting module determines that the amount of wireless service (data, voice, SMS) used has depleted the account zero, the processor 114 may interact with the internal accounting module and/or the wireless provider backend system to limit, prevent, alert the user, and/or control further use of the wireless device 104 as further described herein. The controlled use can include suspending voice calls, allowing limited voice calls, allowing all voice calls, suspending text messages, allowing limited text messages, allowing all text messages, suspending wireless data service, limiting wireless data service, throttling wireless data service, and allowing all wireless data service. In this aspect, the wireless service activation application 155 may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information, the host processor may be capable of ascertaining the operating codes needed to activate that particular wireless device or needed to set its account amount.

Figure 2A:
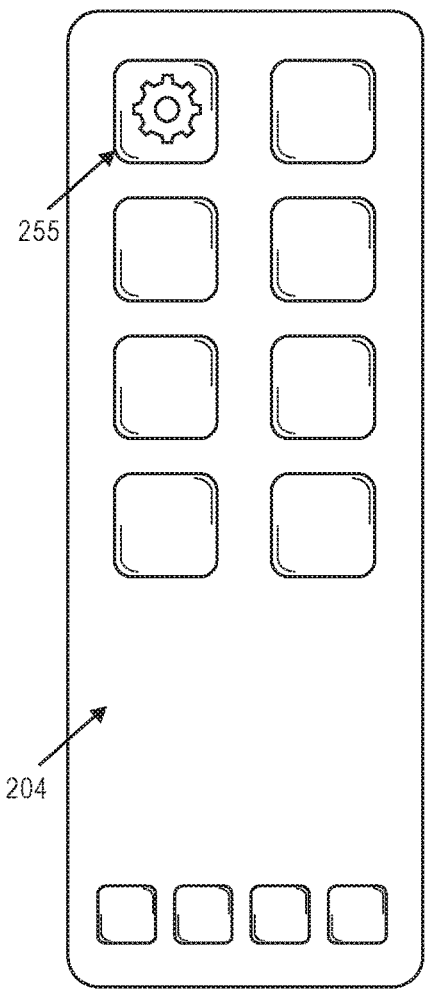
FIG. 2A illustrates an exemplary wireless device with a display of a home screen and FIG. 2B illustrates a subsequent screen of a wireless service activation application with a graphical user interface, both which may be used for the selection and control of the activation of a wireless service in accordance with an aspect of the disclosure.
Figure 2B:
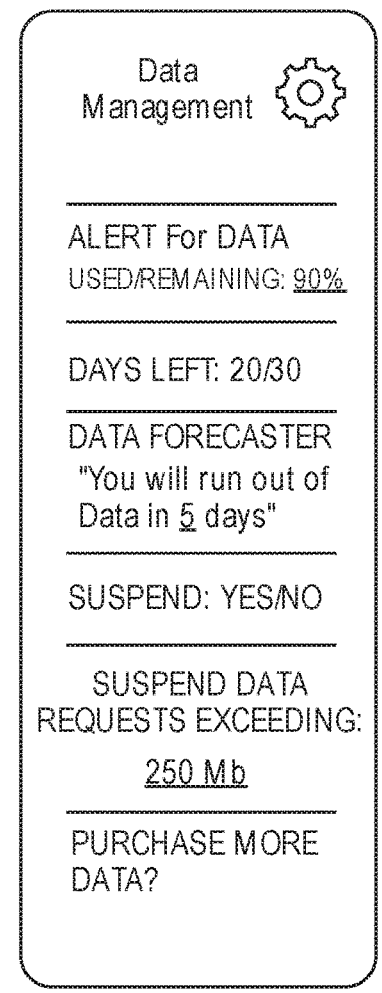

FIG. 2A illustrates an exemplary wireless device with a display of a home screen and FIG. 2B illustrates a subsequent screen of a wireless service activation application with a graphical user interface, both which may be used for the selection and control of the activation of a wireless service in accordance with an aspect of the disclosure. The home screen 200 may include a plurality of icons, e.g. 204, and is not limited to a calling icon, texting icon, internet icon, and the like, allowing a user to perform one or more functions on the wireless device 104. For example, the home screen 200 may also display icons for one or more applications that have been downloaded from the Internet or pre-installed, and unlocked/retrieved. In some aspects, an application such as Google Wallet™, Google Play™, Android Market™, Apple Store™, or the like, may also function with the communication interface 105 to process a payment during the activation of one or more selected wireless service.

Some of the payment and/or authentication applications may be stored in a robust manner that prevents a user from deleting, modifying, tampering, and the like, with the application's functionality. In this regard, the activation service application 255, for example, can provide data management information, as depicted in subsequent screen 250, but may not allow or limit user's input for the activation and/or control of the wireless services. Further, in some aspects the provision of the options depicted in the subsequent screen 250 to the user may only be made available during activation of a wireless service and verification of a unique identifier of the wireless device 104.

Figure 3:
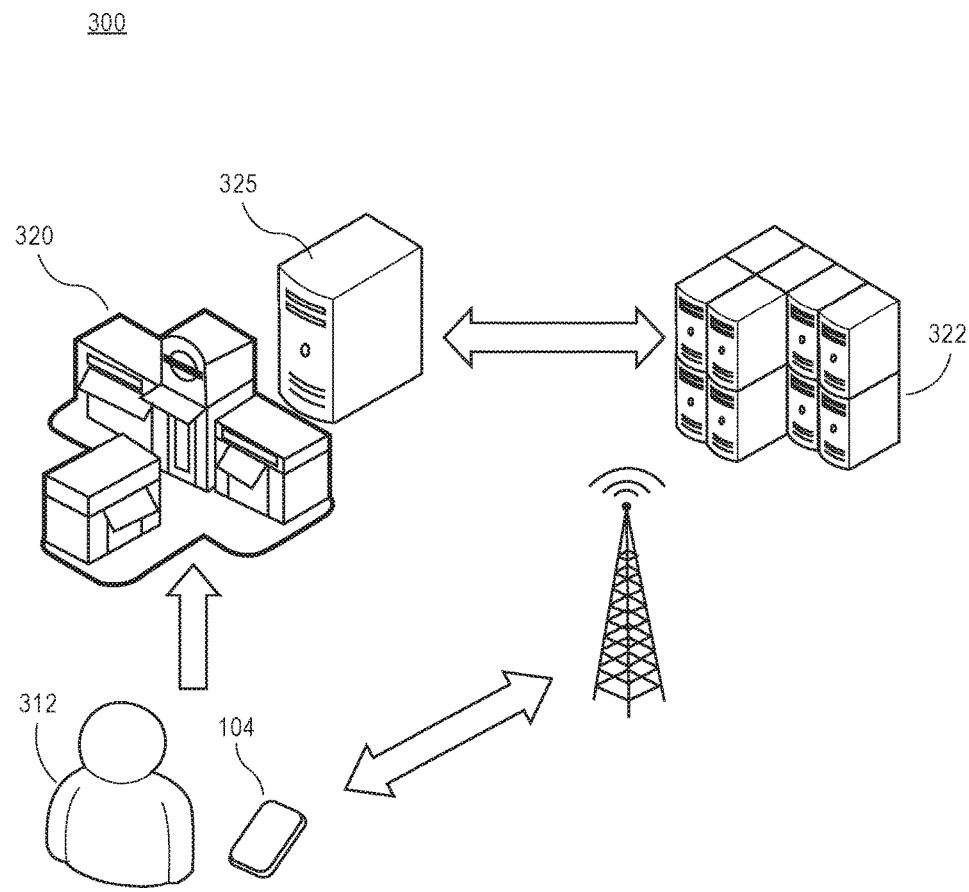
FIG. 3 illustrates a schematic diagram of an exemplary wireless service activation system in accordance with aspects of the disclosure.

Referring now to FIG. 3, a schematic diagram of an exemplary wireless service activation system according to aspects of the disclosure is depicted. In particular, the wireless service provisioning system 300 can be used to activate wireless network service(s) on a wireless device 104 implementing various aspects of the communication interface 105 is disclosed. Unlike conventional activation processes for wireless devices that can require a user 312 to contact a live customer service representative, utilize an interactive voice response system from a landline or another wireless device, or access an Internet website by the user 312 to use a website activation system and enter long activation codes to activate services on a wireless device, the present wireless service provisioning system 300 can be used to activate a wireless device 104 and/or activate services with automated code/information gathering and without requiring access to an agent, website, or general wireless or landline telephone system.

According to aspects of the disclosure, the activated service(s) may include, for example, activation of a wireless service after or during the initial activation of the wireless device 104 by a user 312. The initial activation of the wireless device 104 may be described herein as "out of the box" activation and may take place at a point-of-sale terminal 320. In some additional aspects, the services requested to be activated are one or combinations of: airtime, text messaging, and data plans, but may also include at least one of device upgrades, device reactivations, wireless number changes, and wireless number porting for wireless devices that have previously been activated. The wireless device 104 may include a mobile phone, a smartphone, a wireless computing device or laptop, a tablet, a wireless handheld device, a mobile computing device, or other type of wireless device having services that can be activated wirelessly.

According to some aspects of the disclosure, the point-of-sale terminal 320 can include, for example, a store retailer, a vending machine, a kiosk, and the like, which may also include a communication system 325 that can be used for payment and/or executing security and activation protocols using a communication protocol such as a peer-to-peer protocol. Further, the communication system 325 at the point-of-sale terminal 320 can be configured to communicate with the communication interface 105 of the wireless device 104, which may also be configured to be in communication with a wireless provider backend system 322. Communication with the wireless device 104 may include, for example, one or more of: communication using the wireless device communication interface 105, a wire connector, a data messaging channel, such as an Unstructured Supplementary Service Data (USSD) channel, a Short Message Service (SMS) messaging channel or a Wireless Application Protocol (WAP) messaging channel, a personal area network (PAN), such as a Bluetooth™ communication, an induction wireless communication, an infrared wireless communication, an ultra-wideband communication, a ZigBee™ communication, a wireless fidelity communication channel, a local area network (LAN), a Near field communication (NFC) protocol, or similar communication channel is defined herein. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Communication between the communication system 325 of the point-of-sale terminal 320 and the wireless device 104 may be used to transmit a payment for a wireless service and/or automatically retrieve and/or generate wireless device-related information based on a user's input selection. According to some aspects of the disclosure, the wireless service selection can be made by wireless connecting of the wireless device 104 via a peer-to-peer protocol to a point-of-sale terminal 320, and can include a wireless provider selection, and/or a wireless service type and amount to be activated.

The wireless service selection and wireless device-related information may be transferred to a wireless provider backend system 322. The wireless device-related information can include, for example, the International Mobile Equipment Identify ("IMEI"), an Electronic Serial Number (ESN), Mobile Equipment Identifier (MEID), and/or a serial number for a subscriber identity module (SIM) card installed in the wireless device 104. The SIM card may include a SIM card memory for storing at least a SIM card serial number, for example, an Integrated Circuit Card ID (ICCID). A wireless device not utilizing a SIM card is contemplated as well for use with the invention.

In some aspects, the information transferred may be in the form of an activation message that corresponds and/or includes the wireless provider and/or wireless service selection by the user 312 and automatically retrieved wireless device related information, the wireless device 104 unique identifier, and/or payment/authorization verification from the point-of-sale terminal 320. The activation message including the automatically retrieved information can be generated by a processor including, for example, the processor of the wireless device 104 and/or a processor at the point-of-sale terminal 320. In some aspects, the activation message may be transmitted over a provisioning channel provided over a provisioning wireless carrier network 316 that is available to inactive or unprovisioned wireless devices or via any type of conventional activation protocols known in the art on a communication channel as defined herein. Alternatively, the activation message can be transmitted from the point-of-sale terminal 320 via any wired or other wireless communication type to the wireless provider backend system 322. The wireless provider backend system 322 can include one or more databases wherein authorized unique identifiers of a wireless device 104 may be correlated/recorded when a wireless service is redeemed and/or purchased.

Although it is not required in some aspects, the provisioning wireless carrier network 316 may be used to receive the activation message via a the provisioning channel and forward the activation message in real time to a subscriber provisioning wireless carrier network 316 operated by a service provider for the activation of one or more services for the wireless device 104. Accordingly, the services requested to be activated can include at least one of: an initial "out of the box" activation of wireless services of an unprovisioned wireless device 104 or device upgrades, device reactivations, wireless number changes, the addition or purchasing of services including airtime, enrollments or content, and wireless number porting for wireless devices that have previously been activated or provisioned. In some aspects, the provisioning wireless carrier network 316 can be connected to a wireless carrier server and forward the activation message to the subscriber provisioning wireless carrier network 316, either directly or through a destination server connected to the subscriber provisioning wireless carrier network 316, to initiate service activation and provisioning of the wireless device 104.

Figure 4:
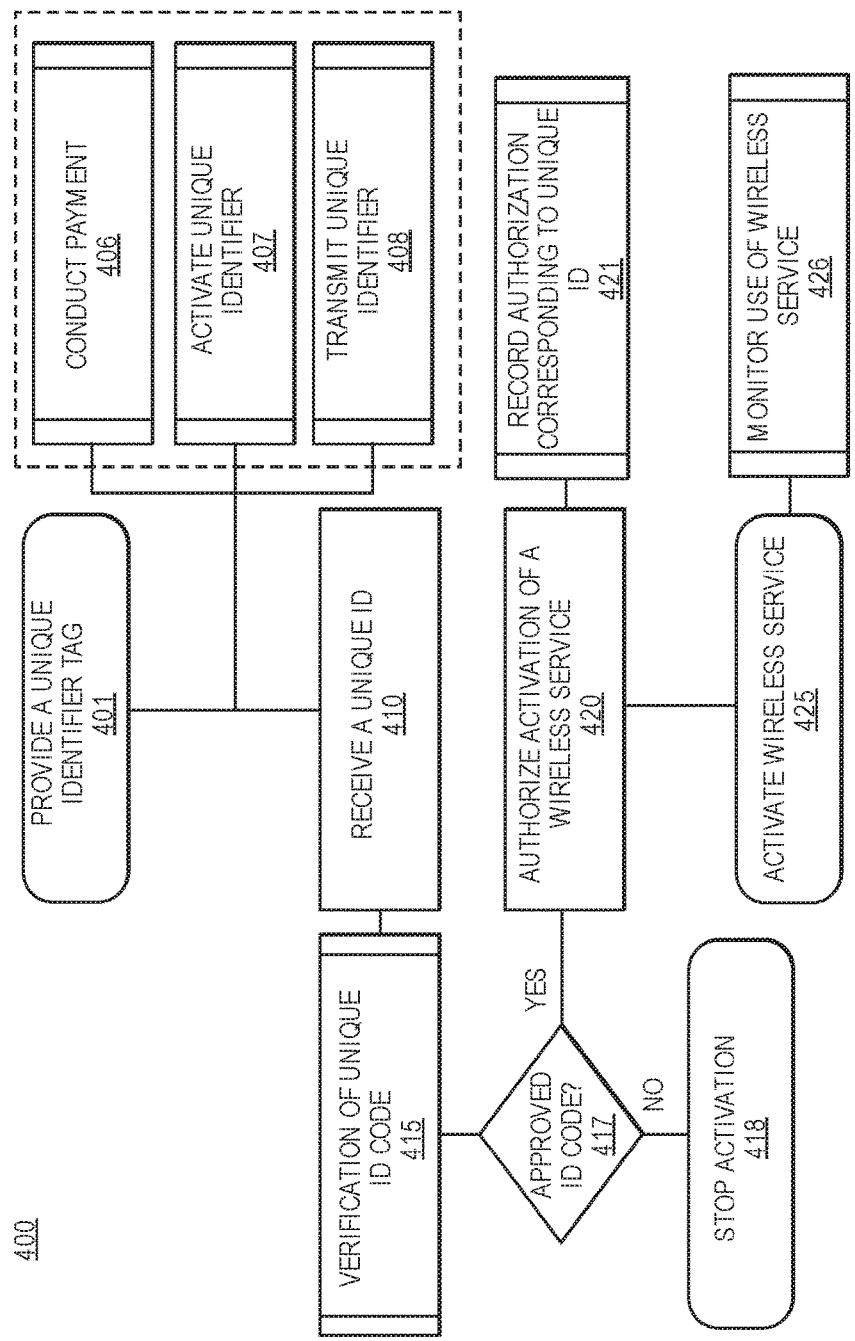
FIG. 4 illustrates exemplary method which may be used to implement the system of the disclosure.

Referring now to FIG. 4, exemplary method steps which may be used to implement systems of the disclosure are depicted in a flowchart 400. In particular, the method steps may include ways in which the communication interface 105 of the wireless device 104 can be implemented to provide or activate one or more wireless service(s) on the wireless device 104. At step 401, a unique identifier is provided for a wireless device 104 during manufacturing. The unique identifier may include a programmed identifier that can correspond to a wireless provider selection and one or more wireless services to be activated. For example, the identifier may include a first code corresponding to a wireless provider, followed by a second code corresponding to a wireless service type, and followed by a third code corresponding to an amount. It is contemplated that additional codes may be included for additional services and amounts, security codes, as well as for production data for statistical analysis performed by the wireless provider, as it may be desired. Each of the codes may be a series of digits including letters, symbols, and/or numbers.

In some aspects, all of the codes, e.g. first code—third code, may be programmed to provide a unique identifier of the wireless device 104 during manufacturing and prior to distribution. However, in some aspects, only the first code may be programmed during manufacturing leaving the others to be programmed at the point-of-sale terminal 320.

At 406, a payment is conducted from the wireless device 104 to the point-of-sale terminal 320. At step 407, after the payment of step 406 has been completed, a service provider would activate the unique identifier. Alternatively, the communication interface 105 may be locked. Locking of the communication interface 105 may include encryption with wireless device 104 information and/or programming of an additional code into the communication interface 105 to generate a unique identifier for the wireless device 104 and/or selection. At 408, the identifier of step 407 may be transmitted to the wireless provider backend system 322.

At step 410 the unique identifier codes along with wireless device 104 information are received by the wireless provider backend system 322. At step 415, the wireless provider backend system 322 can verify the unique identification code by searching for the unique identification code in one or more databases to make sure the unique identification code has not been recorded/redeemed previously. At step 417, if the system finds the unique identification code is not approved, the activation of the wireless service will be stopped 418. Upon stopping the activation 418 of the wireless service, the wireless provider backend system 322 may send a warning message to the user 312 (e.g., using the wireless device 104) and/or the wireless provider. Alternatively at step 420, if when the unique identification code is approved (authentic, not been previously used, or the like), authorization of a wireless service, including payment verification, may take place. At 421, the authorized unique identification code is recorded in a database of the wireless provider before, after, or during, the activation, of step 425, of the wireless service on the wireless device 104 takes place. At step 426, the use of the wireless service activated may be monitored to determine when the corresponding wireless service has been expended by the user 312.

Figure 5:
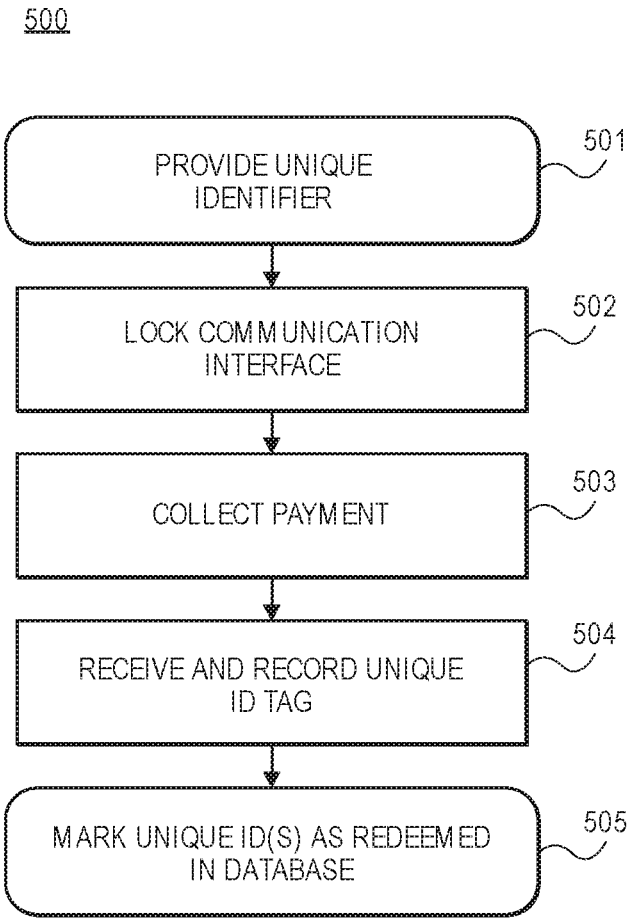
FIG. 5 illustrates an operation flow diagram with exemplary method that may be used for activating a wireless service on a wireless device at the point-of-sale terminal according to aspects of the system of the disclosure.

Referring now to FIG. 5, an operation flow diagram 500 with exemplary method steps that may be used for selling and activating a wireless service on a wireless device at the point-of-sale terminal 320 according to aspects of the system of the disclosure is shown. In particular, the method which may be performed by one or more processors for the sale and activation of one or more wireless services at the point-of-sale terminal 320. At step 501, a unique identifier of the wireless device 104 is provided. No record of the unique identification code may be required to be kept in the wireless provider backend system 322.

Optionally at step 502, the communication interface 105 may be locked to prevent it from being tampered with. Locking of the communication interface 105 may include, for example, encryption and/or the programming of a second code onto the communication interface 105 at the point-of-sale terminal 320. At step 503, before or after the communication interface 105 is locked, payment is collected for the wireless service to be activated and corresponding to the unique identifier. After payment is confirmed, at step 504, the unique identifier of the wireless device 104 can be submitted to the wireless provider backend system 322 to be recorded in a database. For example, the recording may be done in an active database that may be used for verification of active wireless services. During redemption, the unique identifier code(s) programmed may be processed along with information corresponding to the wireless device 104 in which the services are to be activated on by the wireless provider backend system 322 for service activation. Wireless device 104 information can include for example the International Mobile Station Equipment Identity (IMEI), the mobile equipment identifier (MEID), and/or the SIM card unique identifier. At step 505, after activation of the wireless service purchased, the unique identifier code(s) would be marked as redeemed in the database of the wireless provider backend system 322 to prevent duplicate redemption.

Figure 6:
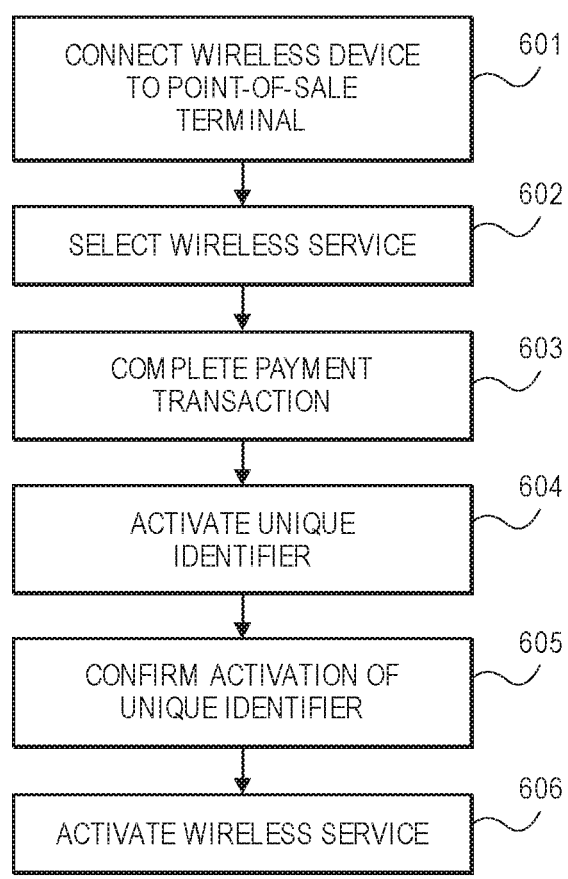
FIG. 6 illustrates an operation flow diagram with exemplary method that may be used for selling and activating a wireless service at the point-of-sale terminal according to aspects of the disclosure.

Referring now to FIG. 6, an operation flow diagram 600 with exemplary method steps that may be used for selling and activating a wireless service at the point-of-sale terminal 320 using a communication interface 105 of a wireless device 104 according to aspects of the present disclosure is shown. In particular, method steps that be performed by a computer to facilitate the sale of a wireless service at a point-of-sale terminal 320 are provided. At step 601, wireless device 104 connects with the point-of-sale terminal 320. At step 602, the user 312 selects a wireless service. At step 603, a payment transaction for the purchase of the wireless service may be completed via a payment application installed on the wireless device 104. Payment applications can include but are not limited to, for example, Google Wallet™, PayPal™, Amazon Payments™, and the such. According to some aspects, the payment application can be used to transmit a payment to the payment processing register at the point-of-sale terminal 320. Accordingly, the payment processing register can receive the unique identifier of a wireless device 104 and receive payment either through a salesperson or a payment application.

At step 604, the unique identifier of the wireless device 104 may be activated. At step 605, the user 312 may confirm the activation using the wireless device 104. At step 606, the user may elect to activate the wireless service at the time of purchase or save the activation code for future use.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), 5G (fifth generation), W-CDMA (Wideband Code-Division Multiple Access), Wireless Fidelity (Wi-Fi), Bluetooth, Near field communication (NFC), and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

The invention claimed is:

1. A wireless service provider system for authorizing prepaid wireless service on a wireless device, the system comprising:
 a server in communication with a communication system, the server being implemented by a wireless service provider backend system;

the communication system implementing a peer-to-peer protocol configured to connect the wireless device and the communication system, and the communication system configured to receive an encrypted unique identifier from the wireless device in conjunction with payment of prepaid wireless service for the wireless device, the unique identifier from the wireless device comprises a code that identifies the wireless device to the server, a code that identifies a wireless service provider, and a code that identifies an amount of wireless service including an amount of data, an amount of SMS, and an amount of voice, and the unique identifier includes at least one of the following: International Mobile Equipment Identity (IMEI), an Electronic Serial Number (ESN), a Mobile Equipment Identifier (MEID), a serial number for a subscriber identity module (SIM), Mobile Directory Number, and an Integrated Circuit Card Identification (ICCID);

the server further configured to receive the unique identifier from the wireless device, the wireless device being configured to implement a unique identifier application to generate, to encrypt, and to provide the unique identifier of the wireless device to the server through the communication system;

the server further configured to provision the prepaid wireless service upon a verification of the unique identifier from the wireless device and the payment of wireless service for the wireless device, the provision of the prepaid wireless service being for the wireless service provider and in the amount of wireless service identified by the unique identifier;

an accounting system configured to monitor a use of the prepaid wireless service provided by the wireless service provider used by the wireless device; and the accounting system further configured to control the use of the prepaid wireless service provided by the wireless service provider used by the wireless device with an accounting device by controlling voice calls, text messages, and wireless data service.

2. The wireless service provider system of claim 1, wherein the server is further configured to record the unique identifier as redeemed once the prepaid wireless service has been provisioned.

3. The wireless service provider system of claim 2, wherein the provision of the prepaid wireless service occurs after verifying, with the server, that the unique identifier of the wireless device has not been previously marked as redeemed in a database, the database being configured to record the unique identifier.

4. The wireless service provider system of claim 3, wherein the database is configured to store the unique identification of the wireless device in response to the server.

5. The wireless service provider system of claim 3, wherein the database is further configured to store the unique identifier of the wireless device along information on the prepaid wireless service provisioned in association with the unique identifier.

6. The wireless service provider system of claim 1, wherein the communication system is configured to conduct and authorize a payment between a user of the wireless device and the communication system.

7. The wireless service provider system of claim 6, wherein the payment between the wireless device and the communication system is received via the communication system.

8. The wireless service provider system of claim 1, wherein the communication system comprises a point-of-sale terminal, and the point-of-sale terminal and the communication system being located in at least one of: a kiosk, a vending machine, and a store.

9. The wireless service provider system of claim 6, wherein the wireless device is configured to make the payment for the prepaid wireless service via the communication system using the peer-to-peer protocol.

10. The wireless service provider system of claim 1, wherein the communication interface of the wireless device is configured to implement the peer-to-peer protocol and the communication interface of the wireless device is configured to use encryption.

11. The wireless service provider system of claim 1, wherein the wireless device includes a communication interface configured to initiate peer-to-peer communication with the peer-to-peer protocol.

12. The wireless service provider system of claim 1, wherein the accounting device comprises an internal accounting device implemented by the wireless device;

wherein the accounting device is configured to monitor the use of the prepaid wireless service provided by the wireless service provider used by the wireless device with the internal accounting device implemented by the wireless device; and wherein the accounting device is configured to control the use of the prepaid wireless service provided by the wireless service provider used by the wireless device with the internal accounting device implemented by the wireless device.

13. The wireless service provider system of claim 1, wherein the accounting device comprises a wireless provider backend system;

wherein the wireless provider backend system is configured to monitor the use of the prepaid wireless service provided by the wireless service provider used by the wireless device with the wireless provider backend system; and wherein the wireless provider backend system is configured to control the use of the wireless service provided by the wireless service provider used by the wireless device with the wireless provider backend system.

14. A method of authorizing prepaid wireless service using a peer-to-peer protocol, the method comprising:

connecting a wireless device to a communication system through the peer-to-peer protocol;

receiving a selection of at least one prepaid wireless service at the communication system to be implemented in the wireless device;

receiving a payment confirmation via the communication system, in response to the selection of at least one prepaid wireless service, for the wireless device;

generating with the wireless device an encrypted unique identifier, the unique identifier comprises a code that identifies the wireless device, a code that identifies a wireless service provider, and a code that identifies an amount of wireless service including an amount of data, an amount of SMS, and an amount of voice, and the unique identifier includes at least one of the following: International Mobile Equipment Identity (IMEI), an Electronic Serial Number (ESN), a Mobile Equipment Identifier (MEID), a serial number for a subscriber identity module (SIM), Mobile Directory Number, and an Integrated Circuit Card Identification (ICCID);

receiving at the communication system, in response to making a payment, the unique identifier from the wireless device through the peer-to-peer protocol;

transmitting the unique identifier and the selected at least one prepaid wireless service from the communication system to a server, the server being implemented by a wireless service provider backend system;

provisioning with the server the at least one prepaid wireless service for the wireless device, the provision of the prepaid wireless service being for the wireless service provider and in the amount of wireless service identified by the unique identifier;

monitoring a use of the prepaid wireless service provided by the wireless service provider used by the wireless device with an accounting device; and controlling the use of the prepaid wireless service provided by the wireless service provider used by the wireless device with the accounting device that includes controlling voice calls, text messages, and wireless data service.

15. The method of claim 14, further comprising:

storing, with the server, the unique identifier and the selected at least one prepaid wireless service received from the communication system;

marking the unique identifier and the selected at least one prepaid wireless service as redeemed once the prepaid wireless service has been provisioned.

16. The method of claim 14, wherein the server is further configured to be in communication with a database configured to store the unique identifier and the selected at least one prepaid wireless service.

17. The method of claim 14, wherein the prepaid wireless service comprises at least one of the following: data service, text message service, and voice service.

18. The method of claim 14, further comprising:

implementing encryption with the communication interface of the wireless device when connecting the wireless device to the communication system through the peer-to-peer protocol to prevent unauthorized use.

19. The method of claim 14, wherein the accounting device comprises a wireless provider backend system, the method further comprising:

monitoring the use of the prepaid wireless service provided by the wireless service provider used by the wireless device with the wireless provider backend system; and controlling the use of the prepaid wireless service provided by the wireless service provider used by the wireless device with the wireless provider backend system.

20. The method of claim 14, wherein the accounting device comprises an internal accounting device implemented by the wireless device, the method further comprising:

monitoring the use of the prepaid wireless service provided by the wireless service provider used by the wireless device with the internal accounting device implemented by the wireless device; and controlling the use of the prepaid wireless service provided by the wireless service provider used by the wireless device with the internal accounting device implemented by the wireless device.

* * * * *